US006755430B1

(12) United States Patent
Watwood et al.

(10) Patent No.: US 6,755,430 B1
(45) Date of Patent: Jun. 29, 2004

(54) WHEELCHAIR DRIVE ASSEMBLY

(75) Inventors: Brian M. Watwood, P.O. Box 2426, Granite Bay, CA (US) 95746; Errol C. Armstrong, Hollister, CA (US); Dayn E. Beals, Sacramento, CA (US); Duane DeJong, Elk Grove, CA (US)

(73) Assignee: Brian M. Watwood, Granite Bay, CA (US)

(*) Notice: Subject to any disclaimer, the term of this patent is extended or adjusted under 35 U.S.C. 154(b) by 0 days.

(21) Appl. No.: 09/883,450

(22) Filed: Jun. 13, 2001

(51) Int. Cl.[7] ................................................ B62M 1/14
(52) U.S. Cl. .................................... 280/250.1; 280/246
(58) Field of Search .............................. 280/520.1, 244, 280/246, 248, 253, 255, 258; 475/14; 74/354

(56) References Cited

U.S. PATENT DOCUMENTS 654,986 A 7/1900 Krueger
1,425,082 A * 8/1922 Eklund ........................ 280/246
3,563,568 A 2/1971 Sass et al.
4,358,126 A * 11/1982 Mitchell et al. ......... 280/250.1
4,453,729 A 6/1984 Lucken
4,503,724 A 3/1985 Ward
4,516,648 A * 5/1985 Berger et al. ............... 180/210
4,560,181 A 12/1985 Herron
4,735,431 A 4/1988 Tait
4,762,332 A 8/1988 Seol
4,840,076 A 6/1989 Brubaker et al.
4,858,483 A 8/1989 Blakemore
5,020,815 A 6/1991 Harris et al.
5,167,168 A 12/1992 Beumer
5,263,729 A 11/1993 Watwood et al.
5,303,945 A 4/1994 Oxford
5,362,081 A 11/1994 Beidler et al.
5,486,016 A 1/1996 Godin et al.
5,577,748 A 11/1996 Dombrowski et al.
5,632,499 A 5/1997 Hutcherson et al.
5,657,836 A 8/1997 BeVier
5,743,544 A 4/1998 Weaver
5,846,154 A 12/1998 Godin
5,881,854 A 3/1999 Rougnon-Glasson
6,007,082 A 12/1999 Watwood et al.

FOREIGN PATENT DOCUMENTS

EP 0497 999 A1 8/1992
GB 2278582 * 7/1994 ............. 280/250.1

* cited by examiner

*Primary Examiner*—Daniel G. DePumpo
(74) *Attorney, Agent, or Firm*—Bernhard Kreten

(57) ABSTRACT

A wheelchair drive mechanism having a transmission providing forward, rearward and neutral motion through movement of a drive arm in an arcuate path.

6 Claims, 7 Drawing Sheets

WHEELCHAIR DRIVE ASSEMBLY

FIELD OF THE INVENTION

The following invention is generally related to instrumentalities and methodologies used in wheelchair propulsion. More specifically, the instant invention is directed to an apparatus and method for utilizing a gear drive assembly to aid in human propulsion of a wheelchair.

BACKGROUND OF THE INVENTION

The following invention reflects applicant's ongoing efforts at improving wheelchair propulsion devices.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
|---|---|---|
| | U.S. PATENT DOCUMENTS | |
| 654,986 | July 31, 1900 | Krueger |
| 3,563,568 | February 16, 1971 | Sasse, et al. |
| 4,453,729 | June 12, 1984 | Lucken |
| 4,503,724 | March 12, 1985 | Ward |
| 4,560,181 | December 24, 1985 | Herron |
| 4,735,431 | April 5, 1988 | Tait |
| 4,762,332 | August 9, 1988 | Seol |
| 4,840,076 | June 20, 1989 | Brubaker, et al. |
| 4,858,483 | August 22, 1989 | Blakemore |
| 5,020,815 | June 4, 1991 | Harris, et al. |
| 5,167,168 | December 1, 1992 | Beumer |
| 5,263,729 | November 23, 1993 | Watwood, et al. |
| 5,303,945 | April 19, 1994 | Oxford |
| 5,362,081 | November 8, 1994 | Beidler, et al. |
| 5,486,016 | January 23, 1996 | Godin, et al. |
| 5,577,748 | November 26, 1996 | Dombrowski, et al. |
| 5,632,499 | May 27, 1997 | Hutcherson, et al. |
| 5,657,836 | August 19, 1997 | BeVier |
| 5,743,544 | April 28, 1998 | Weaver |
| 5,846,154 | December 8, 1998 | Godin |
| 5,881,854 | March 16, 1999 | Rougnon-Glasson |
| 6,007,082 | December 28, 1999 | Watwood, et al. |
| | FOREIGN PATENT DOCUMENTS | |
| EP 0497 999 A1 | August 12, 1992 | Chang |

SUMMARY OF THE INVENTION

The present invention represents the inventor's constant evolving odyssey in providing solutions that continue to satisfy the needs of those with physical challenges.

A gear train is disclosed in the hub of each wheel of a wheelchair. The gear train includes linkage to a hand area of the chair to provide easy shifting between forward, reverse and neutral. The hand area allows power to be transferred to the wheels from a user's arms to move the wheelchair.

OBJECTS OF THE INVENTION

Accordingly, it is a primary object of the present invention to provide a new and novel device and method for human propulsion of a wheelchair.

It is a further object of the present invention to provide a device and method as characterized above which is simple to assemble and maintain.

It is a further object of the present invention to provide a device and method as characterized above which promotes self-reliance and independence.

Viewed from a first vantage point, it is an object of the present invention to provide a wheelchair, comprising, in combination: a frame; a seat on said frame; a pair of lead wheels on said frame; a pair of drive wheels on said frame; a pair of driver arms coupled to said drive wheels; and transmission means coupled between said driver arms and said wheels to induce either forward or reverse motion upon driver arm activation.

These and other objects will be made manifest when considering the following detailed specification when taken in conjunction with the appended drawing figures.

DESCRIPTION OF PREFERRED EMBODIMENTS

Figure 1:
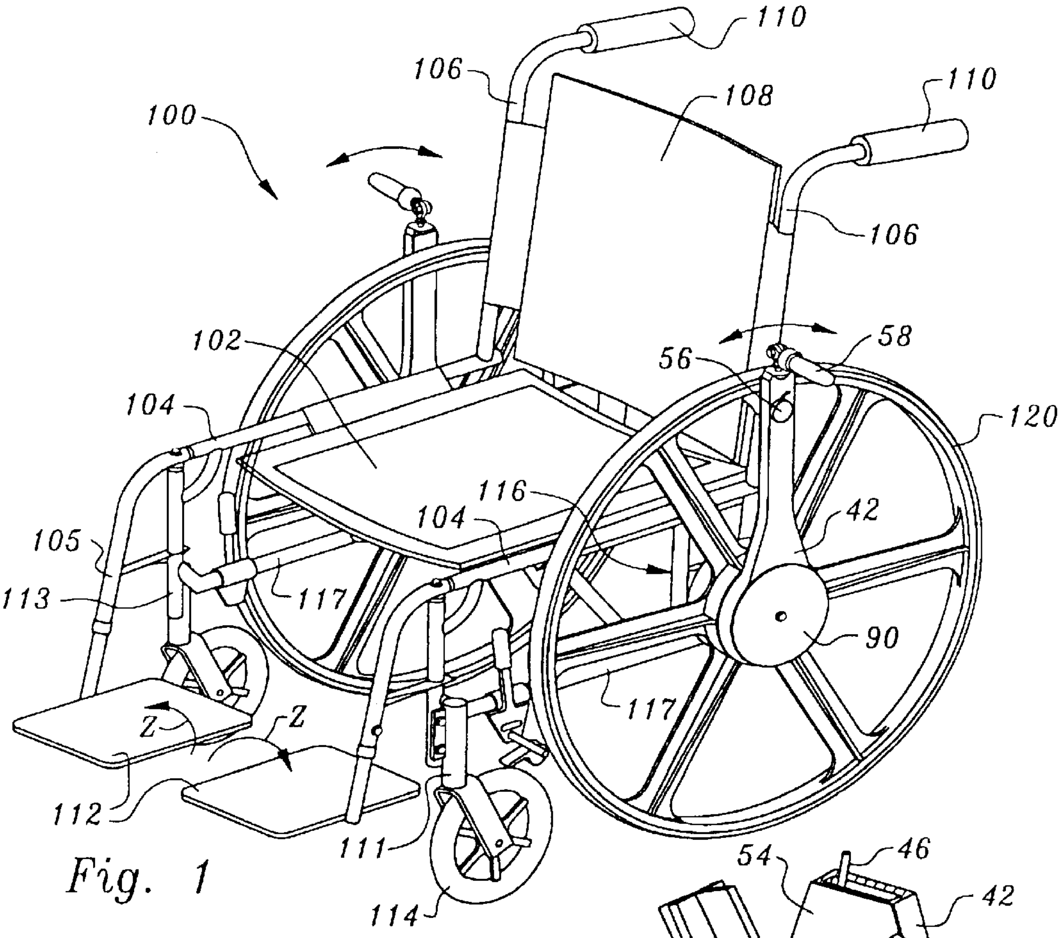
FIG. 1 is a perspective view of the wheelchair according to the present invention.

Considering the drawings, wherein like reference numerals denote like parts throughout the various drawing figures, reference numeral 10 (FIG. 5) is directed to the drive assembly according to the present invention.

In its essence, the drive assembly 10 propels a wheelchair. As shown in FIG. 1, the wheelchair 100 includes a seat portion 102 mounted on two horizontal frame rails 104, the ends of which are connected to two vertical frame rails 106 on which a back portion 108 is mounted. One end of each vertical frame rail 106 terminates in a handlebar 110 for pushing the wheelchair 100. A pair of foot platforms 112 depend from forward downward links 105 of the horizontal frame rails 104. The foot platform supports the user's foot and may be rigidly attached or may pivot along Arrow Z to a storage position adjacent links 105. Wheel attachment frames 116 (FIG. 2) also depend from the horizontal frame rails 104, and include an elongate, horizontal, slot-like aperture 118 to secure an exposed end of wheel shaft 12 when a wheel 120 is to be attached. Each wheel attachment frame 116 includes two vertical struts 115 depending from horizontal frame rails 104, and terminating in a horizontal frame rail member 117 paralleling horizontal frame rail 104 and below slot-like aperture 118. Aperture 118 is supported on a plate 119 which spans struts 115. Rail member 117 terminates forwardly in a vertical rod 113, extending between horizontal frame rail 104 and rail 117 and supporting at a lower end a caster sleeve 111 which receives caster type wheel 114.

Each of the two wheels 120 contains a recessed hub 126 (FIG. 5) about the central hub opening 128. Slots 124 radiate outwardly from the central hub opening 128 to receive the drive casing 20 and permit motion.

Figure 2:
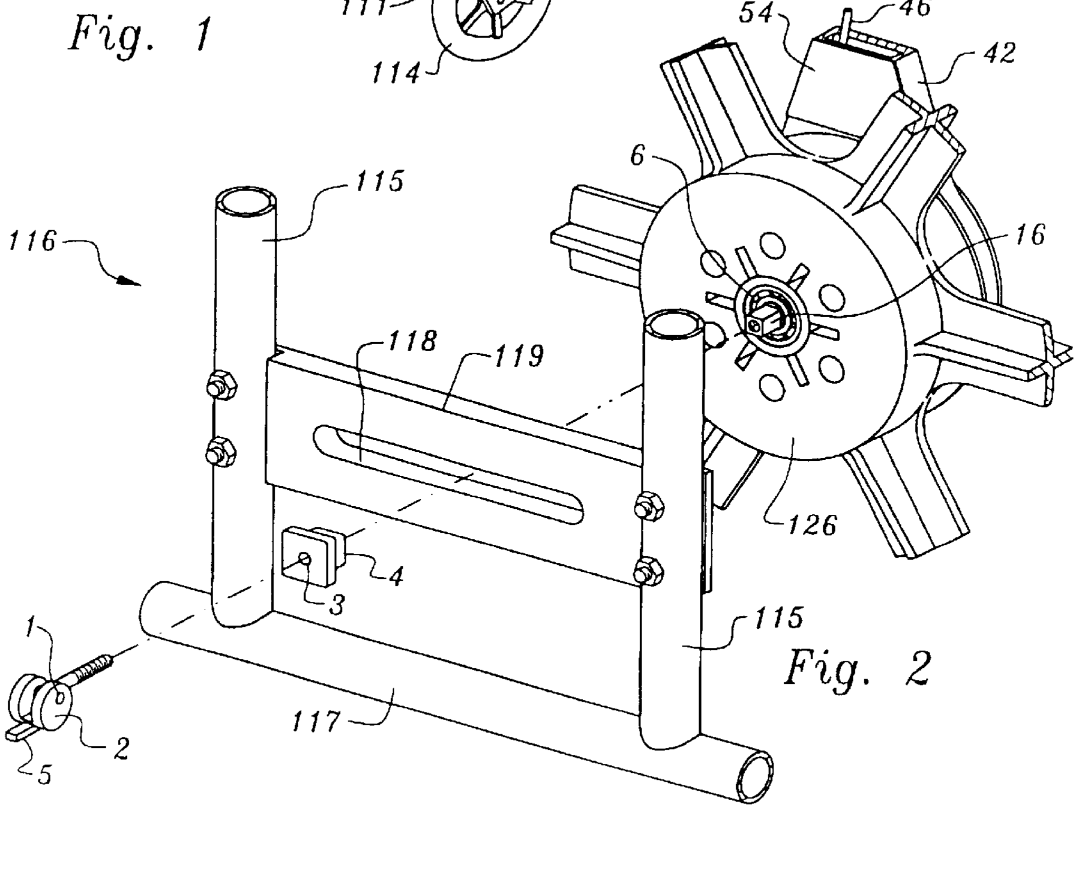
FIG. 2 is a detail showing mounting of the drive and wheel assembly onto the wheel chair frame.

One (outboard) side of each wheel 120 is covered with a face plate 90 (FIG. 1). The wheel shaft 12 projects from the other side, terminating in the exposed end 16 (FIG. 2). The side with the face plate 90 is the exterior side when the wheel 120 is mounted on the wheelchair 100. The wheel 120 is attached by threading the exposed end 16 of the wheel shaft 12 through the aperture 118 in the wheel attachment areas 116 underneath the seat portion 102. A square locking nut 4 (or alternatively guide bushing) is placed on the exposed end 16 of the wheel shaft 12, and, preferably, a quick-release cam 2 is inserted into the end of the wheel shaft 12. Two bearings 6 locate shaft 12 precisely within central exterior sleeve of drive casing 20 and through gore 3 of nut 4. Cam 2 threads into a threaded gore of shaft 12 and pivots on cam 2 allows rotation of the cam to lock on nut 4. Tab 5 on cam 2 helps in rotation.

Figures 5, 6:
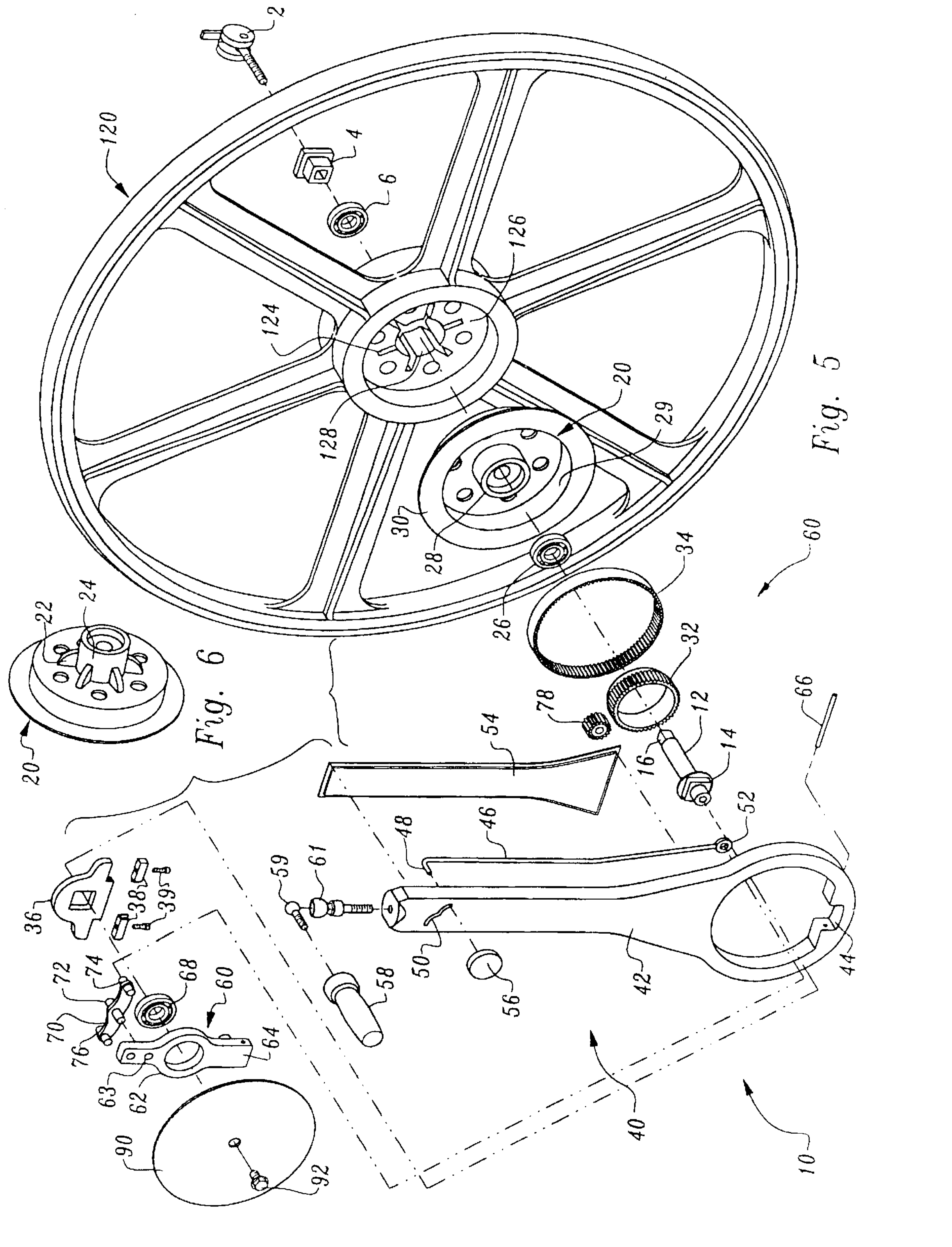
FIG. 5 is an exploded parts view of the drive mechanism.
FIG. 6 is a perspective view of a component thereof.

With reference to FIG. 5, depicting the exterior side of the wheel 120, a drive casing 20 having the same shape as the recessed hub 126 is inserted into the recessed hub 126. The drive casing 20 also has a brake surface 30 which coincides with the outer periphery of the recessed hub 126. Protruding drive splines 22 are present on the exterior side of the drive casing 20 on sleeve 24, and these drive splines 22 engage the slots 124 in the hub 122 when the drive casing 20 is inserted into the recessed hub 126.

Figure 9:
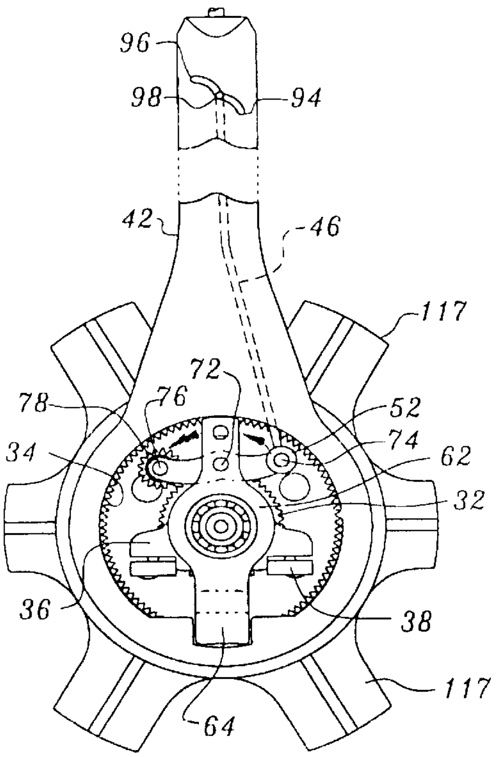
FIG. 9 shows the transmission in neutral.

A crank assembly 40 is located on the other side of the drive casing 20, allowing the occupant to utilize forward (FIGS. 7, 7A, 8, 8A), reverse (FIGS. 10, 10A, 11), and neutral (FIG. 9) modes of operation. A drive assembly 60 is then mounted on the interior end of the wheel shaft 12, and a face plate 90, secured with an outside bolt 92 threaded to shaft 12, covers the hub 126.

The exterior side of the drive casing 20 includes a centrally-located exterior sleeve 24; the drive splines 22 radiate outward from the exterior sleeve 24. The exterior sleeve 24 engages the central hub opening 128, while the drive splines 22 engage the slots 124 that extend radially from the central hub opening 128. An interior wheel shaft bearing 6 is contained within the exterior sleeve 24. A centrally-located interior sleeve 28 projects into the interior portion of the drive casing 20. An inner gear 32 formed as an annular band encircles the interior sleeve 28 of the drive casing 20. Teeth of gear 32 are found on the outer periphery. An outer gear 34 formed as an annular band in the teeth on an inner band portion is mounted on the inner circumferential surface 29 of the drive casing 20.

Figure 13:
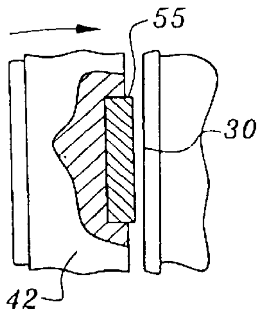
FIG. 13 shows a brake pad.
Figure 13A:
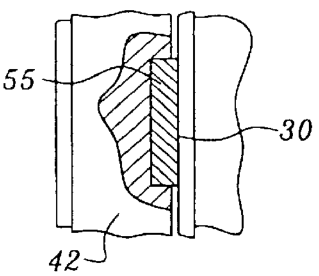
FIG. 13A is a similar view with the brake pad actuated.
Figure 11A:
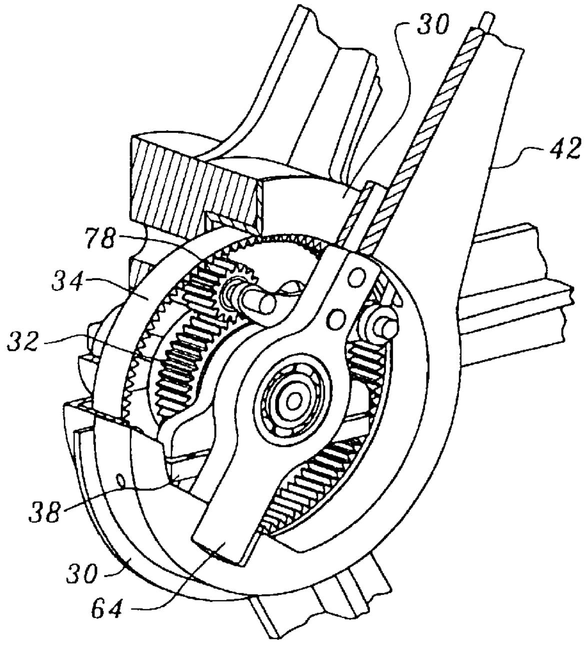
FIG. 11A is a perspective view of FIG. 11.
Figure 12:
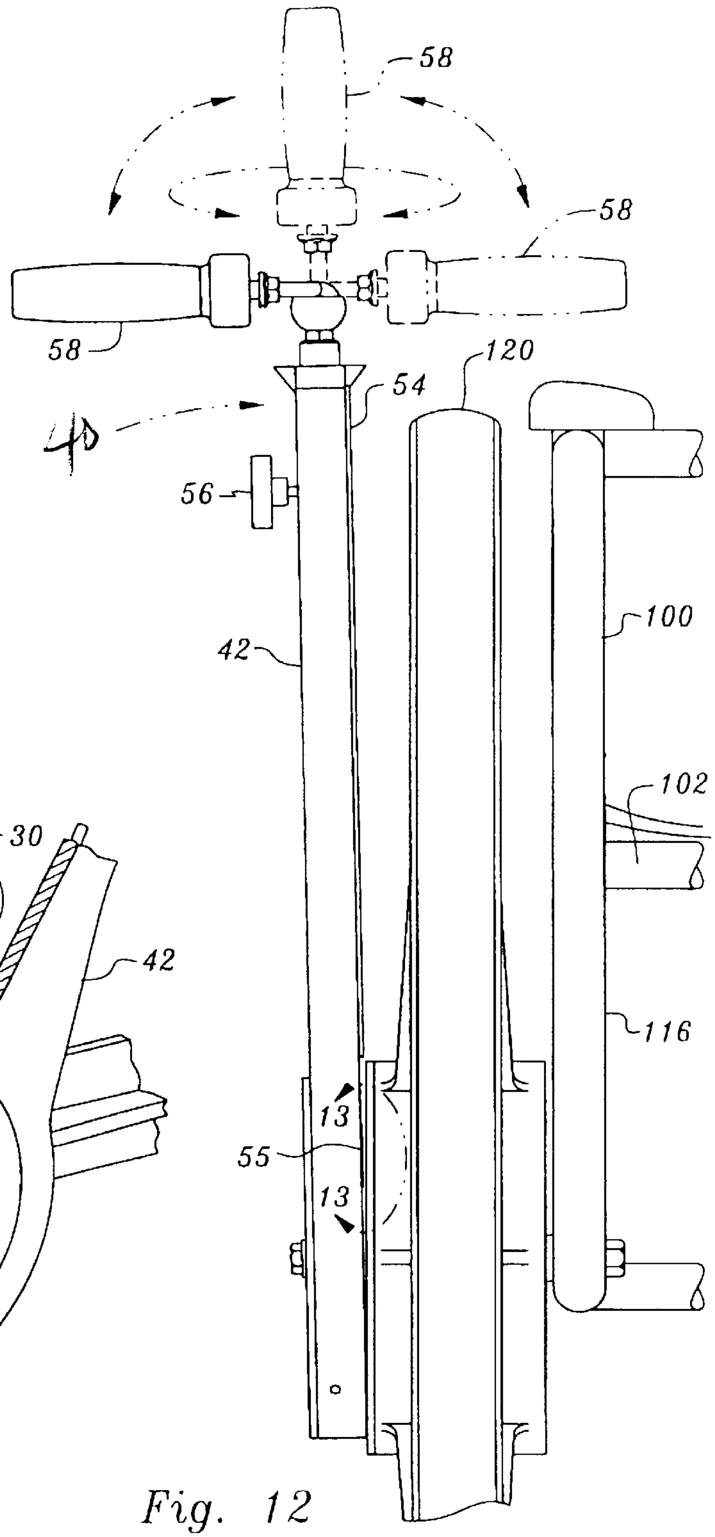
FIG. 12 is a view particularizing the details of the adjustable handle.

The crank assembly 40 contains a crank housing 42 which encases a shift link 46, covered by a crank cover 54. The crank housing 42 also includes a keyway 44 to receive and secure the drive assembly 60. The shift link 46 has a knob support 48 at one end and a spindle retainer 52 at the other end. The knob support 48 extends through the crank housing 42 and is connected to a shift knob 56 and is constrained in a shift gate 50, which allows selection of forward, reverse, and neutral modes of operation. The spindle retainer 52 is connected to a spindle 74 on toggle 70. Attached to the crank housing 42 adjacent the seat portion 102 of the wheelchair 100 is a pivotably adjustable handle (FIG. 12) 58, which allows the occupant to control the wheelchair 100. The crank cover 54 contains a brake pad 55 (FIGS. 13 and 13A) that contacts the brake surface 30 of the drive casing 20 when the handle 58 is pulled toward the wheelchair 100 by its occupant, shown in FIGS. 12, 13, and 13A. Handle 58 includes a ball 59 threaded into the handle. Ball 59 is received in socket 61 threaded into crank 42.

Figure 1A:
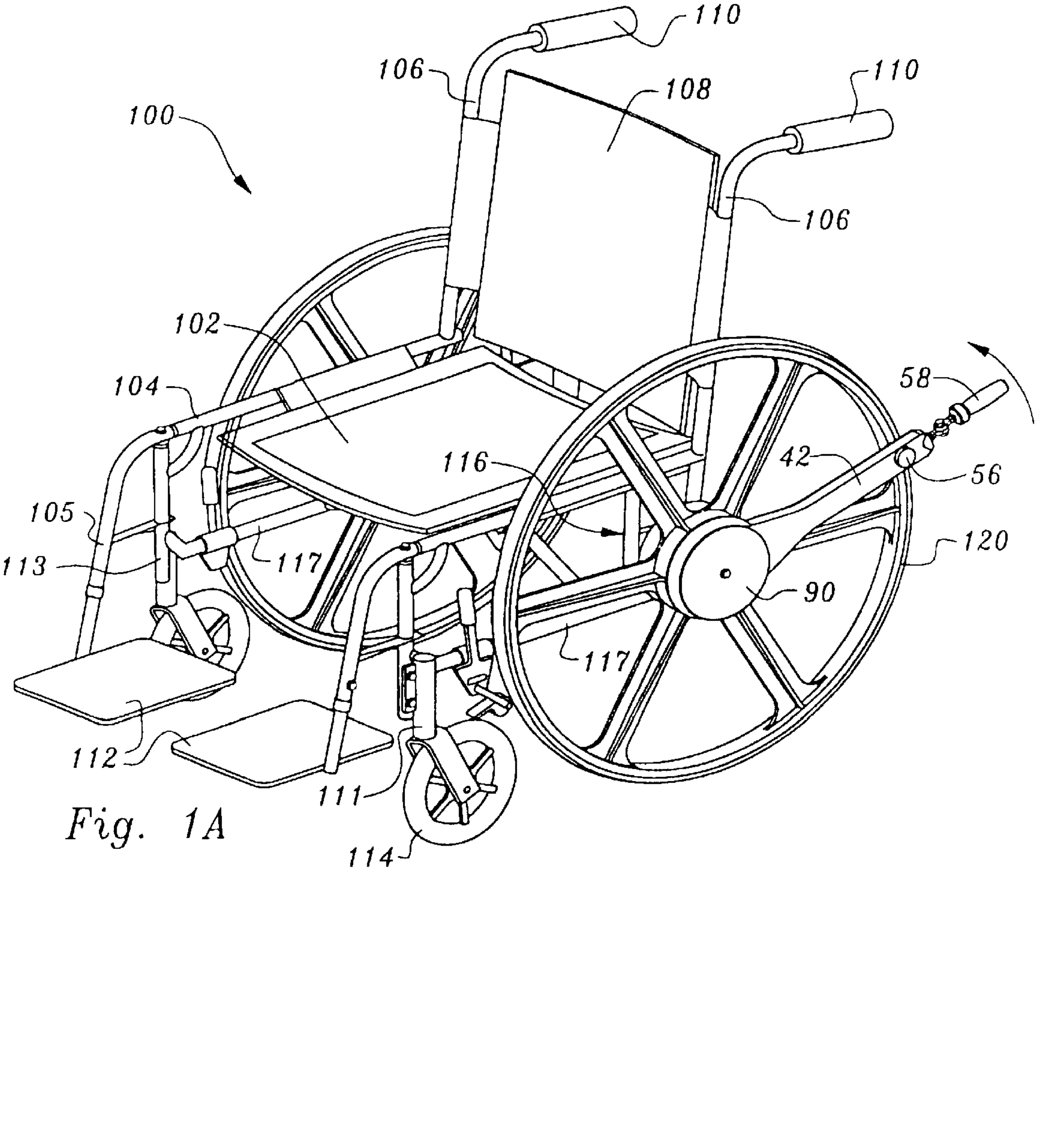
FIG. 1A is a perspective view similar to FIG. 1 with the drive mechanism oriented in a second position.
Figure 14:
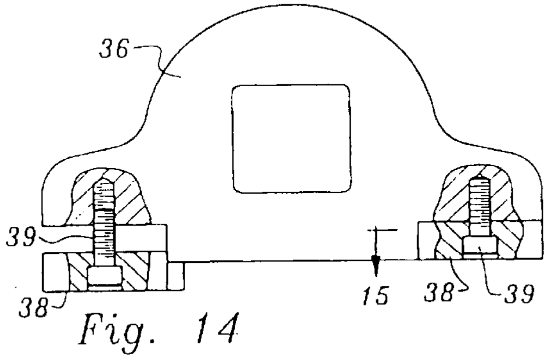
FIG. 14 is a view of one of the components of FIG. 5.
Figure 15:
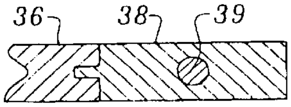
FIG. 15 is a sectional view taken along lines 15—15 of FIG. 14.
Figure 3:
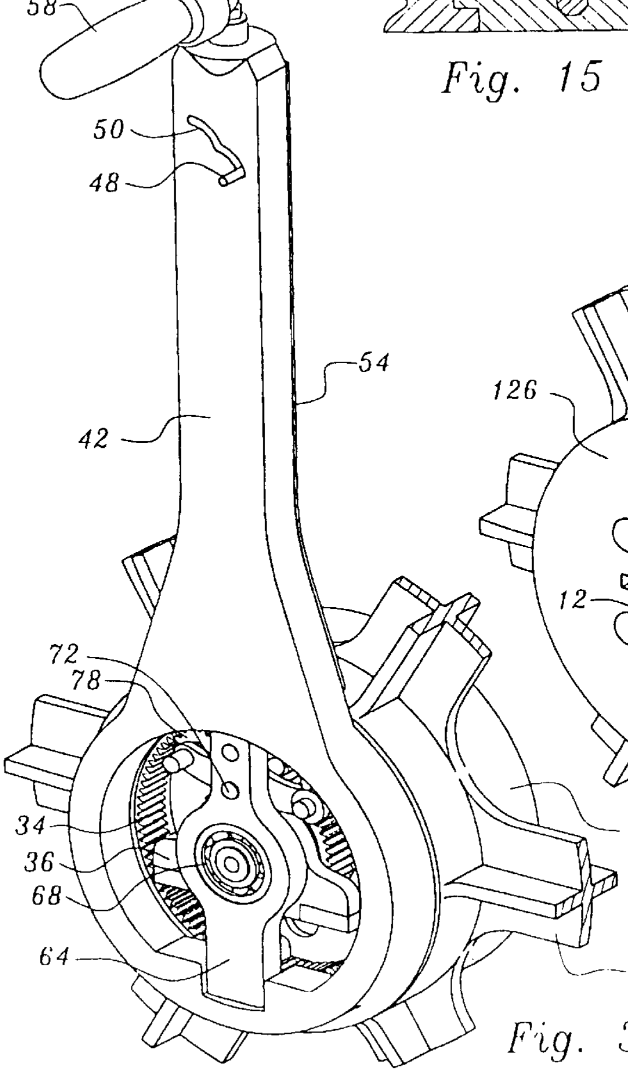
FIG. 3 is a perspective view of the drive arm and gear mechanism.
Figure 4:
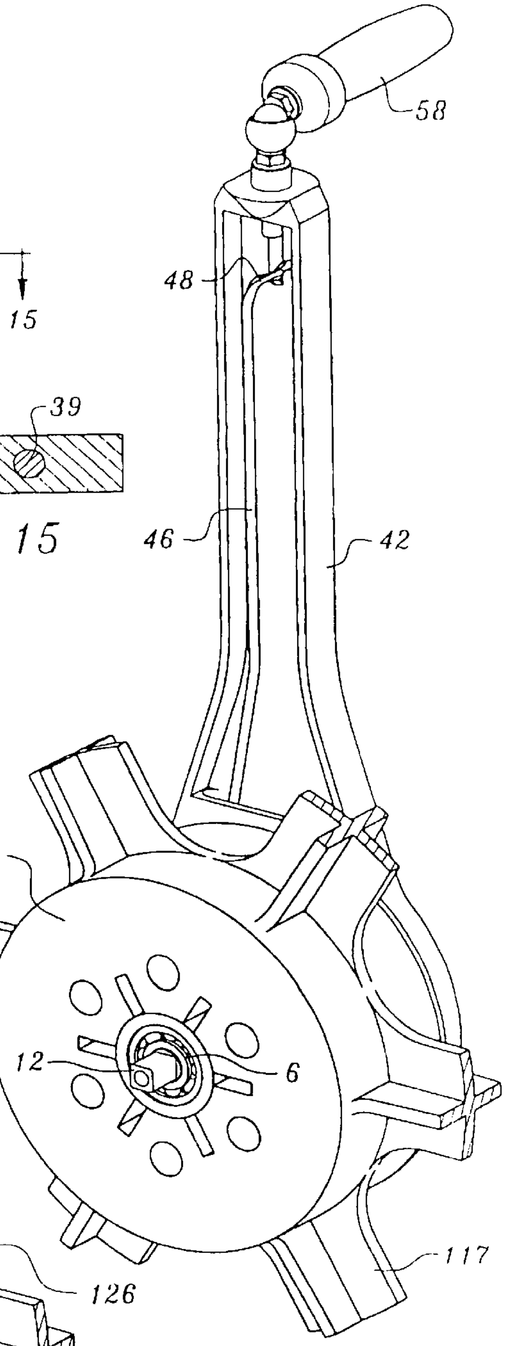
FIG. 4 is a second view thereof.

The wheel shaft 12 passes through the exterior wheel shaft bearing 26, the drive casing 20, and the interior wheel shaft bearing 6 to engage with the quick-release cam 2 through the square locking nut 4. The end of the wheel shaft 12 under the seat portion 102 of the wheelchair 100 contains a box-shaped yoke mount 14, designed to accommodate a support yoke 36, which keeps the wheel shaft 12 from flexing under load. As shown in FIGS. 14–15, the support yoke 36 includes adjustable stops 38, held in place by set screws 39, to limit motion of the handle 58 by the occupant if the handle is dropped while the shift knob 56 is in the neutral position (e.g. FIG. 1A). These stops 38 may be adjusted using the set screws 39 to best suit the needs of the occupant.

The drive assembly 60 contains a drive link 62, upon which is mounted a shifting toggle 70 via fulcrum 72 passing through support hole 63. The drive link 62 is shaped to include a key 64 that registers in the keyway 44 in the crank housing 42. When the drive link 62 is so placed, the key 64 is secured with a pin 66 in the keyway 44. The shifting toggle 70 includes a shift spindle 74 and a pinion spindle 76, one on each side of a fulcrum 72. The shift spindle 74 is connected to the spindle retainer 52 on the shift link 46. The pinion spindle 76 has a pinion 78 mounted upon it, and the pinion 78 is located between the inner gear 32 and the outer gear 34 in the drive casing 20 when the drive assembly 60 is installed. The connection of the shift link 46 to the shift spindle 74 in the drive assembly 60 allows the pinion 78 to engage the inner gear 32 or the outer gear 34, depending on the orientation of the shift knob 56. This allows the wheelchair 100 to move in a forward or reverse direction.

Figure 7:
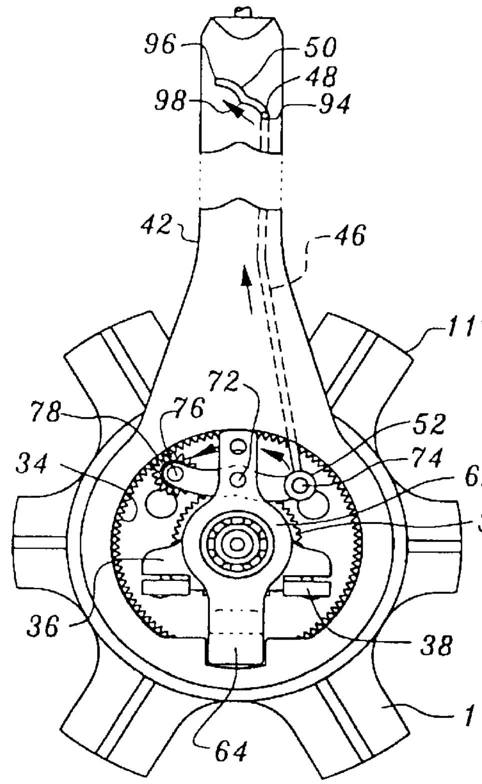
FIG. 7 is a front view depicting the drive mechanism in forward.
Figure 7A:
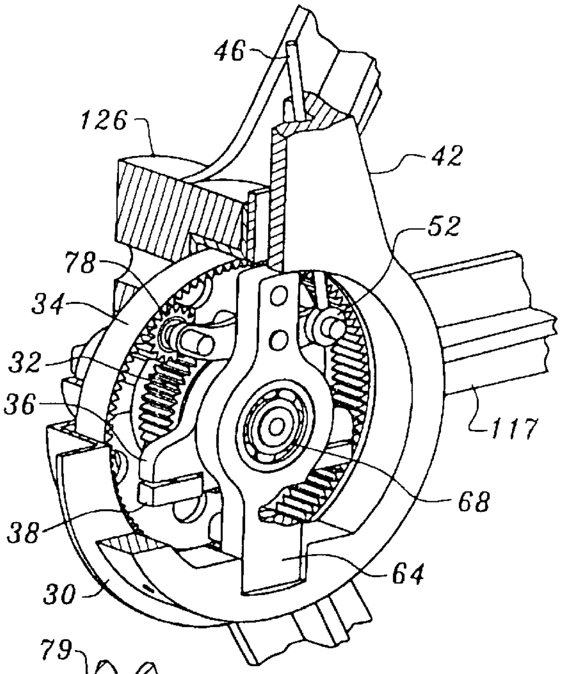
FIG. 7A is a perspective view.
Figure 7B:
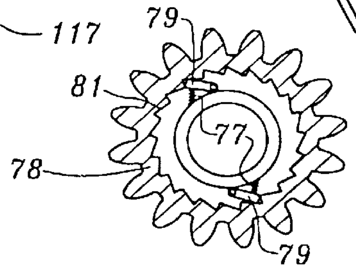
FIG. 7B details the pinion 78 of FIGS. 5 and 7–11.
Figure 8:
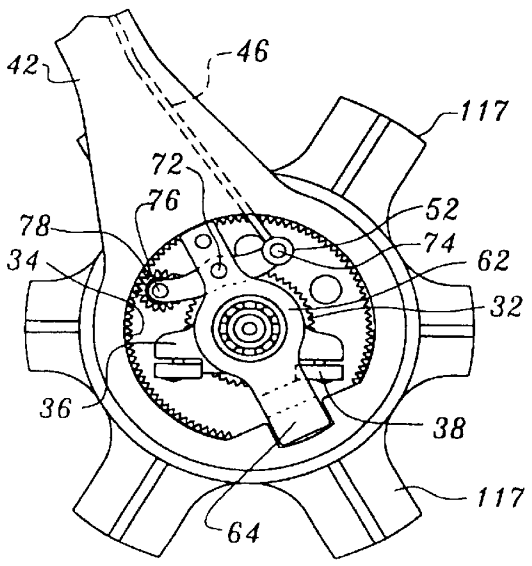
FIG. 8 is a similar view to FIG. 7 showing one range of stroke.
Figure 8A:
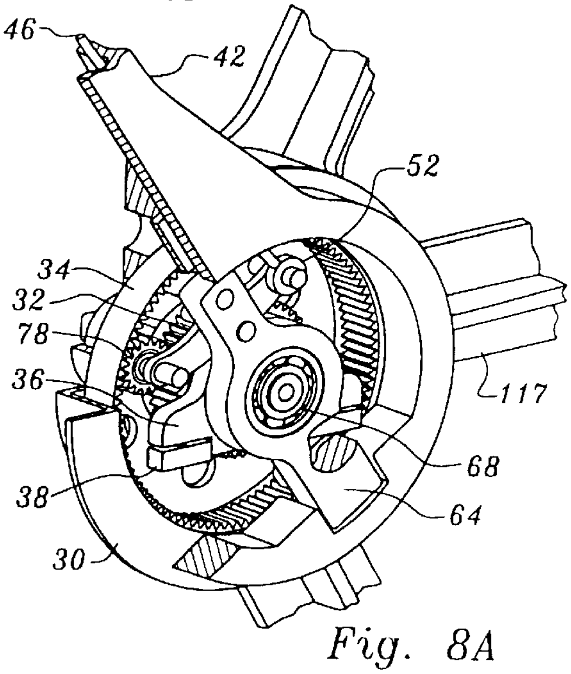
FIG. 8A is a perspective view thereof.

The wheelchair 100 is propelled by using the pivotable handles 58, connected to the crank assemblies 40, which are attached to each wheel 120. The drive mechanism 10 translates this motion to the wheels 120. When the wheelchair 100 is in a particular gear (e.g., forward or reverse), motion in any other direction is prevented by the pinion 78. FIG. 7B shows that the pinion 78 includes an interior unidirectional pawl 79 biased via springs 77 to engage teeth 81 only in one direction. Thus, the pinion 78 connects with either inner gear 32 or outer gear 34 for driving engagement. The pinion 78 when engaged, permits rotation in one direction only, preventing slippage of the wheel 120 in a direction other than that desired. When the neutral gear is selected, freewheeling, or motion in either direction, is allowed.

Figure 10:
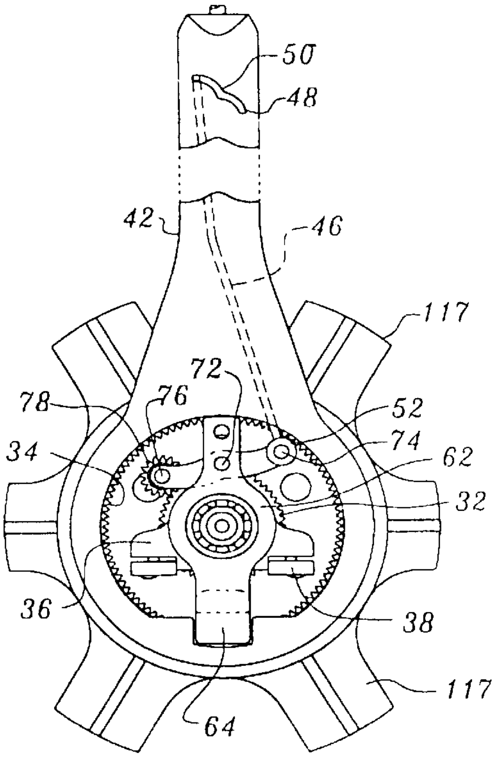
FIG. 10 shows the transmission in reverse.
Figure 10A:
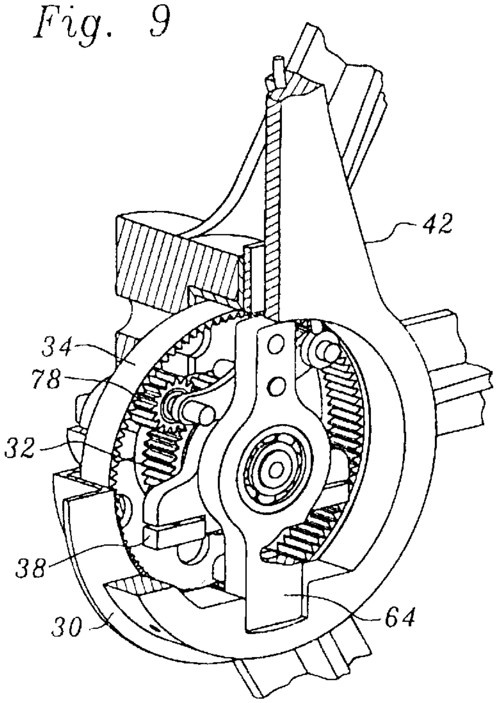
FIG. 10A shows a perspective view of FIG. 10.
Figure 11:
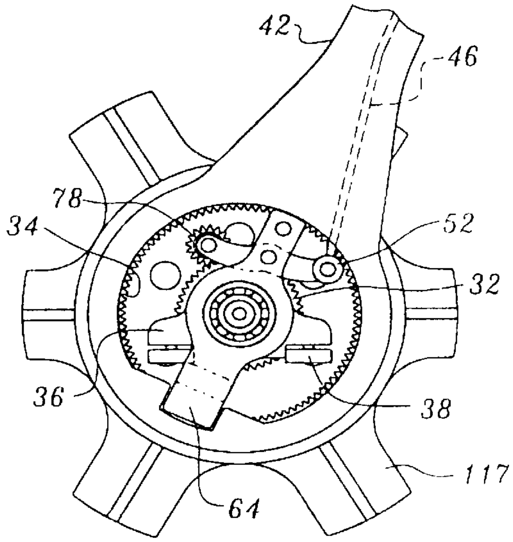
FIG. 11 is a further view of FIG. 10.

Preferably, the shift gate 50 has a forward position 94, a reverse position 96, and a neutral position 98. When the shift knob 56 is in the neutral position 98 (FIG. 9), the pinion 78 engages neither the inner gear 32 nor the outer gear 34. Thus, the wheel 120 may freely rotate in either direction. When the shift knob 56 is moved into the reverse position 96, the shift link 46 moves the shift spindle 74 and the pinion spindle 76 about the fulcrum 72 such that the pinion 78 contacts the inner gear 32 (FIGS. 10, 10A). When the crank assembly 40 is moved from the position shown in FIG. 10 to that shown in FIG. 11, the inner gear 32 rotates which causes the wheel 120 to also move.

To utilize the forward direction, the shift knob 56 is moved to the forward position 94 in the shift gate 50. This motion translates through the fulcrum 72 such that the pinion 78 registers with the outer gear 34. When the pinion 78 is so engaged and the crank assembly 40 is moved by the occupant using the pivotable handle 58 (FIG. 8), the outer gear 34 moves causing the wheel to move in the forward direction.

Moreover, having thus described the invention, it should be apparent that numerous structural modifications and adaptations may be resorted to without departing from the scope and fair meaning of the instant invention as set forth hereinabove and as described hereinbelow by the claims.

What is claimed is:

1. A wheelchair, comprising, in combination:

a frame;

a seat on said frame;

a pair of lead wheels on said frame;

a pair of drive wheels on said frame;

a pair of driver arms coupled to said drive wheels;

and transmission means coupled between said driver arms and said wheels to induce either forward or reverse motion upon driver arm activation, wherein said transmission means includes:

a drive casing having a first and second gear, and a pinion shiftable between said gears for engaging forward and reverse.

2. The wheelchair of claim 1, wherein said transmission means further includes:

a shift link having a first end adjacent a handle and a second end coupled to a toggle, said toggle coupled operatively to said pinion for selective engagement between forward and reverse.

3. The wheelchair of claim 1, wherein said pinion includes:

a pawl biased to engage teeth to allow unidirectional driving of said pinion.

4. The wheelchair of claim 1 wherein said driver arms include:

brakes which contact a brake surface on said drive casing to control motion.

5. The wheelchair of claim 1, wherein said gears in said transmission are oriented in concentric relationship and mounted on said drive casing, said casing including a brake flange and fixed on a wheel of said wheelchair.

6. The wheelchair of claim 5 wherein said forward and reverse gears comprise teeth, and wherein said teeth of said forward and reverse gears face each other.

* * * * *